UNITED STATES PATENT OFFICE.

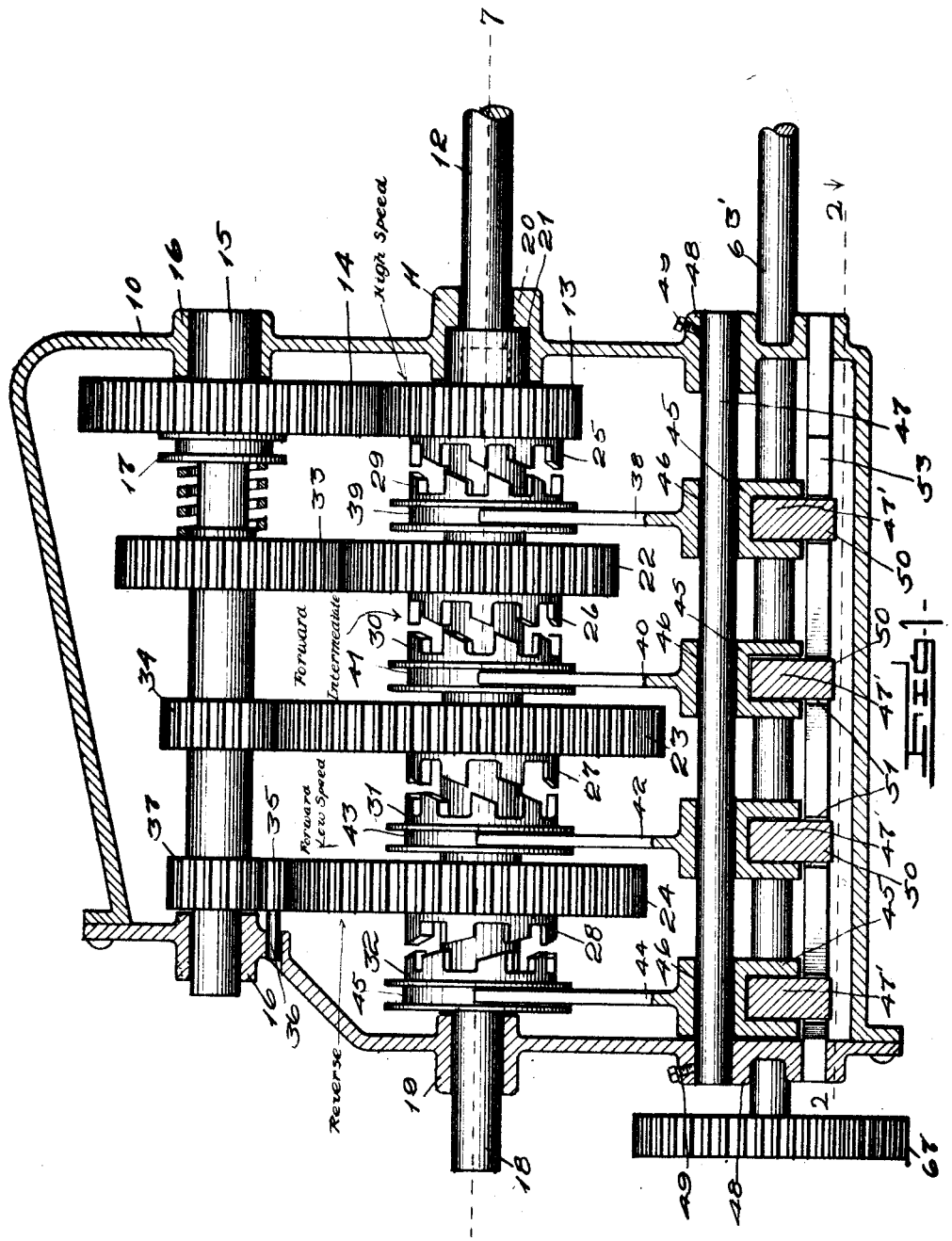

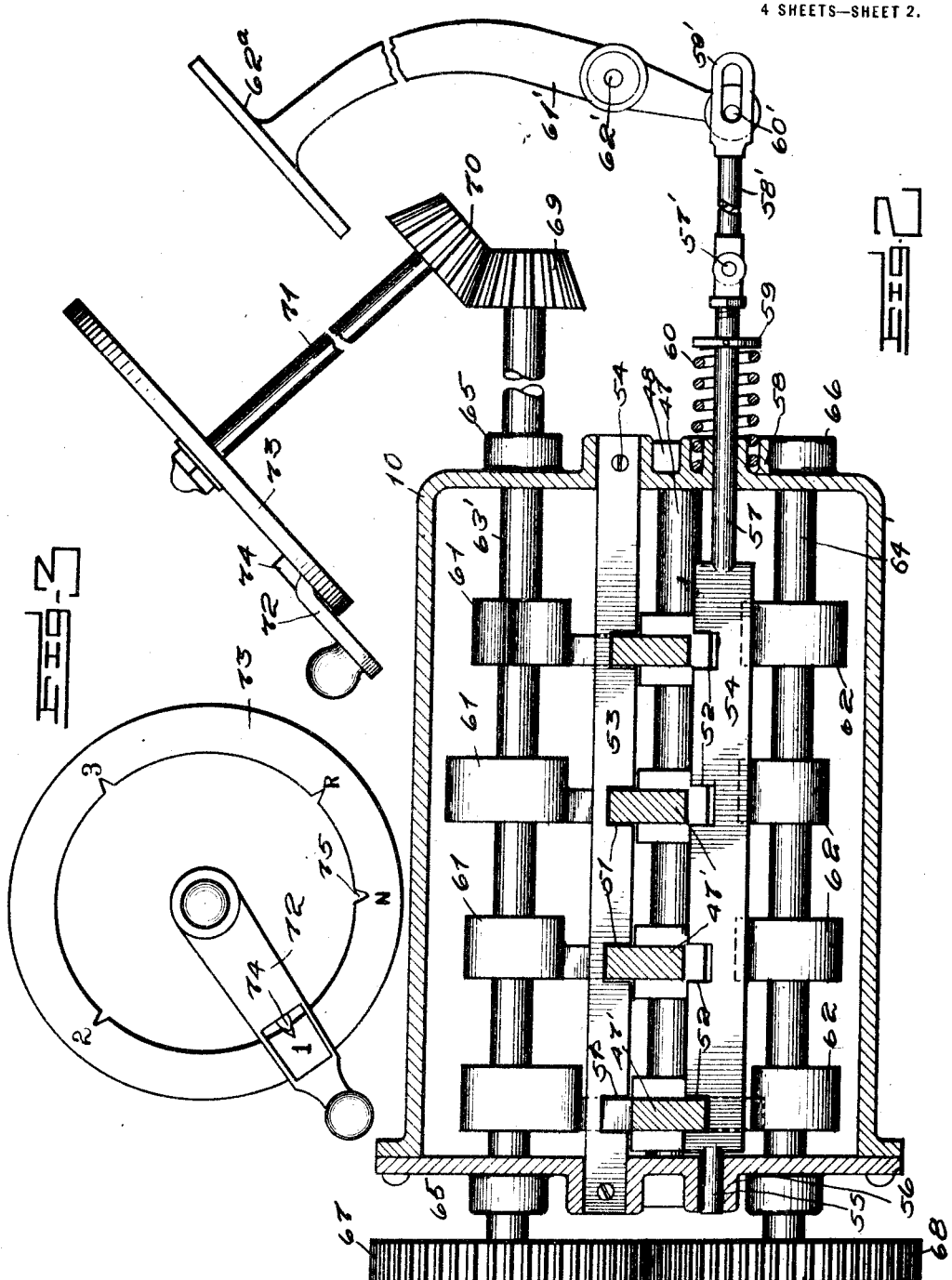

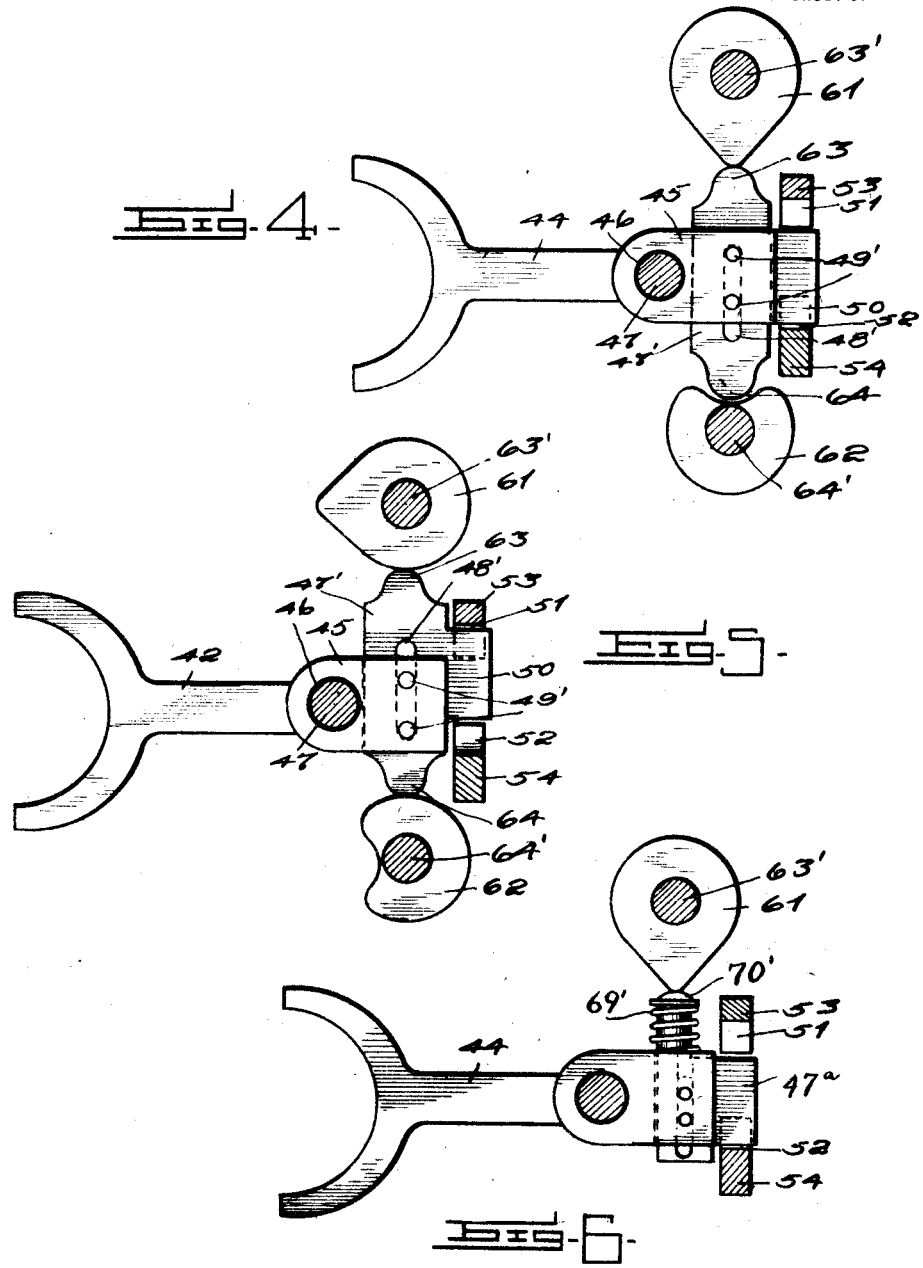

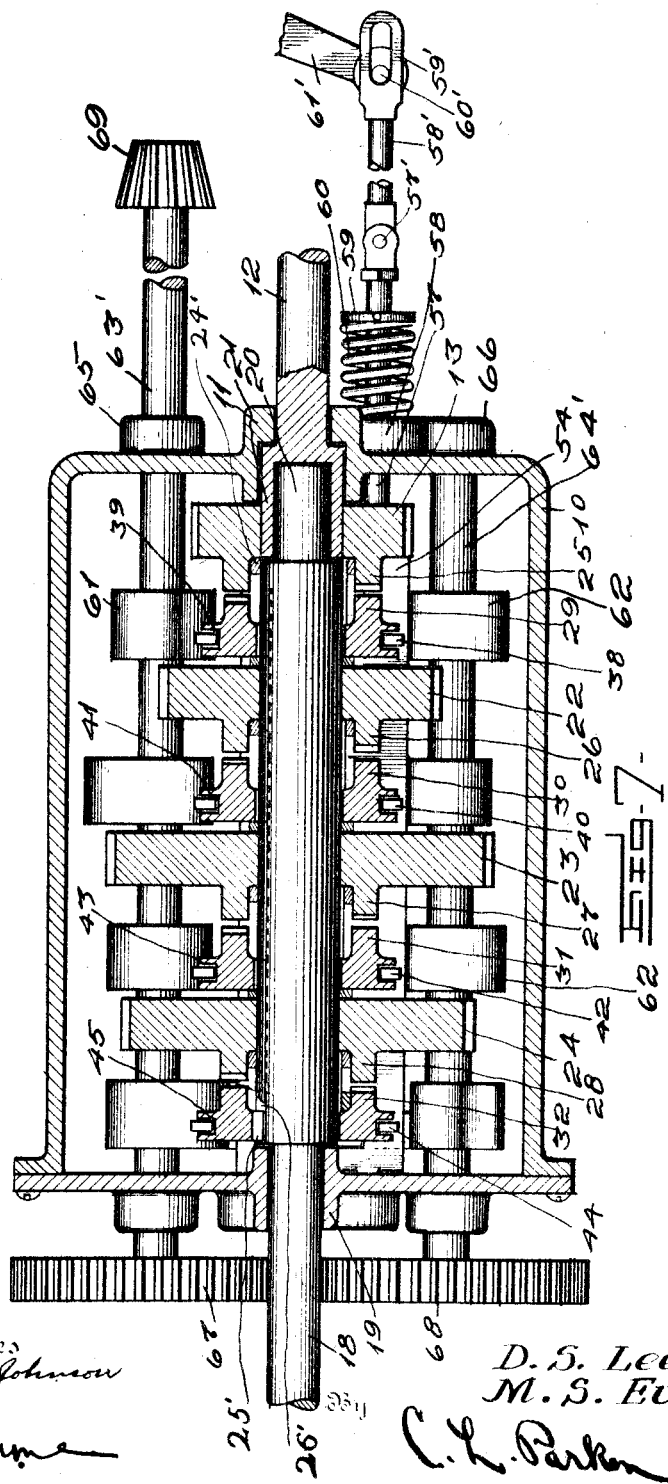

DONALD S. LEECH AND MERLIN S. EVANS, OF LIMA, OHIO.

TRANSMISSION-GEARING.

1,141,563.

Specification of Letters Patent.

Patented June 1, 1915.

Application filed April 29, 1914. Serial No. 835,141.

*To all whom it may concern:*

Be it known that we, DONALD S. LEECH and MERLIN S. EVANS, citizens of the United States, residing at Lima, in the county of Allen and State of Ohio, have invented certain new and useful Improvements in Transmission-Gearing, of which the following is a specification.

The present invention relates to improvements in mechanically operated selective transmission gearing, particularly well adapted to be used in connection with automobiles or self propelled vehicles.

An important object of the invention is to provide transmission gearing of the above mentioned character, wherein the changing from one speed to another, or from one direction to the other, is accomplished by the manipulation of a control lever and a shifting lever or pedal, preferably the pedal ordinarily employed to operate the friction clutch, serving to connect the crank shaft of the engine with the rear wheels of the automobile.

A further object of the invention is to provide apparatus of the above mentioned character, wherein the control lever is locked against movement, prior to the operation of the shifting lever or pedal for disconnecting the engine shaft from the driving wheels of the vehicle.

A further object of the invention is to provide apparatus of the above mentioned character, which is simple in construction, inexpensive to manufacture, convenient in use, strong, and durable.

A further object of the invention is to provide apparatus of the above mentioned character, which is compact in construction, and which will occupy very little space in use.

Other objects and advantages of the invention will be apparent during the course of the following description.

In the accompanying drawings forming a part of this specification and in which like numerals are employed to designate like parts throughout the same, Figure 1 is a plan view of transmission gearing embodying our invention, parts thereof being shown in section, Fig. 2 is a longitudinal vertical sectional view taken on line 2—2 of Fig. 1, Fig. 3 is a plan view of the control lever, Fig. 4 is a side elevation of clutch-shifting means, showing the connecting element in the shifting position, Fig. 5 is a similar view showing the connecting element in the locked position, Fig. 6 is a similar view of a slightly different form of clutch-shifting means, and, Fig. 7 is a central longitudinal sectional view taken on line 7—7 of Fig. 1.

In the drawings, wherein for the purpose of illustration is shown a preferred embodiment of the invention, the numeral 10 designates a preferably horizontally arranged casing, secured to the frame work of an automobile or other vehicle, (not shown), by any suitable means.

Journaled within a suitable bearing 11 formed upon one end of the casing 10, is a driving shaft 12, to be connected with the crank-shaft of the engine, by means of a multiple disk or cone clutch, (not shown). Rigidly connected with the inner end of the driving shaft 12 (see Figs. 1 and 7) and disposed within the casing 10 is a pinion or gear 13, engaging a larger pinion or gear 14, arranged within the casing 10 and mounted upon a rotatable counter-shaft 15, journaled through bearings 16, as shown. This larger pinion or gear 14 is normally locked to the counter-shaft 15 for rotating the same, by a spring pressed clutch-member 17, as shown. It is thus seen that the driving shaft 12, through the medium of the pinions or gears 13 and 14, continuously rotate the counter-shaft 15.

The numeral 18 (see Figs. 1 and 7), designates a driven rotatable shaft, adapted to be connected with the rear wheels of the automobile or other vehicle by means of a suitable differential gearing, as is customary. The driven shaft 18 is arranged in end-to-end relation to the driving shaft 12, and has one end thereof journaled within a bearing 19, the opposite end of the same being provided with a reduced extension 20 rotatably mounted within an opening formed in a head 21 of the shaft 12, as shown. Rotatably or loosely mounted upon this driven shaft 18 are pinions or gears 22, 23 and 24, but these pinions or gears cannot move perceptively longitudinally of the driven shaft, the same being held against such movement by rings 24', rigidly secured to the shaft 18, as shown. The pinions or gears 13, 22, 23 and 24 are provided upon corresponding sides or faces with toothed clutch-elements 25, 26, 27 and 28, rigidly secured thereto and preferably formed integral therewith. Splined upon the driven shaft 18 by means of teeth 25', passing into a longitudinal slot 26', are coacting toothed clutch-elements 29, 30, 31 and 32, which are adapted to be moved into and out of engagement respectively with the clutch-elements 25, 26, 27 and 28, as shown.

The large pinion or gear 22 is engaged by a smaller pinion or gear 33, rigidly mounted upon the counter-shaft 15; the large pinion or gear 23 by a smaller gear or pinion 34, rigidly mounted upon the counter-shaft 15; the large gear 24 by an intermediate or reversing small pinion or gear 35, carried by a stub-shaft 36; and the pinion or gear 35 by a pinion or gear 37, rigidly mounted upon the counter-shaft 15, as shown. The co-acting clutch-elements 25 and 29 constitute high speed drive; the clutch-elements 26 and 30 forward intermediate drive; the clutch-elements 27 and 31 forward low speed drive; and the clutch-elements 28 and 32 reverse drive, as indicated.

The clutch-element 29 is moved longitudinally of the driven shaft 18 by a shifting fork 38, operating within an annular groove 39; the clutch-element 30 by a shifting fork 40, operating within an annular groove 41; the clutch-element 31 by a shifting fork 42, operating within an annular groove 43; and the clutch-element 32 by a shifting fork 44 operating within an annular groove 45, as shown. As more clearly shown in Figs. 1, 4, and 5, each of these shifting forks is provided at its outer end with an enlarged forked head 45, having a transverse opening 46, to slidably receive a relatively stationary horizontal guide rod 47, extending into bearings 48 and held fast therein by means of clamping bolts 49, or the like, as more clearly shown in Fig. 1. Each of the forked heads 45 receives a vertically reciprocatory or movable bolt or connecting element 47' (see Figs. 4 and 5), provided with a longitudinally extending slot or opening 48', to receive transverse pins 49', secured to the forked head 45, as shown.

The bolt or connecting element 47', as more clearly shown in Figs. 4 and 5, is provided with a lateral extension 50 adapted to be alternately moved into openings or notches 51 and 52, formed in an upper locking bar or element 53 and a lower shifting bar or element 54, as shown. The locking bar or element 53 (see more particularly Figs. 2, 4, and 5), is rigidly secured to the casing 10, as shown at 54'. The shifting bar or element 54 is longitudinally movable or reciprocatory and is provided at one end with a reduced extension 55, operating within a bearing or guide 56, and at its opposite end with an operating rod 57, operating through a bearing or guide 58, as shown. The rod 57 extends forwardly outwardly of and beyond the casing 10 and has a ring 59 rigidly secured thereto which is engaged by a suitably stiff compressible and expansible coil spring 60, mounted in the bearing or guide 58, and engaging the adjacent end of the casing 10, as clearly illustrated in Fig. 2. From the foregoing, it is obvious that the spring 60, when the rod 57 is released, automatically moves the reciprocatory shifting bar or element 54 forwardly, for a reason to be more fully explained.

Selective means are provided to shift a desired one of the bolts or connecting elements 47' laterally or vertically, to lock a selected inner pinion or gear to the driven shaft 18, upon the forward movement of shifting element or bar 54. This selective means comprises cams 61 and 62, adapted to engage with the cam-ends 63 and 64 formed upon each bolt or connecting element 47', as clearly shown in Fig. 5. These cams 61 and 62 are arranged above and below the bolt or connecting element 47' and are rigidly mounted upon rotatable cam-shafts 63' and 64' respectively, as shown. These cam-shafts, as clearly shown in Fig. 2, are journaled through bearings 65 and 66, and have inter-meshing pinions or gears 67 and 68 rigidly connected with corresponding ends thereof, whereby they rotate together. It is to be understood that each set or pair of cams 61 and 62 is so arranged upon the cam-shafts 63' and 64' with relation to the other pairs or sets, that only one set or pair of the same can operate at the same time, to move the corresponding bolt or connecting element 47' to the operative position or into the opening or notch 52, and this set or pair of cams returns the locking bolt or element 47' to the inoperative position or within the opening or notch 51, before or at the same time that the other set or pair of cams moves the corresponding other element or bolt 47' to the operative position. In Fig. 6, there is shown a different form of shifting means, the cam 62 being dispensed with. A bolt or connecting element 47ª is mounted to reciprocate within the forked head 45, to move into and out of the notches 51 and 52. This bolt 47ª is moved upwardly by a coil spring 69', surrounding a headed bolt 70', rigidly secured thereto. The cam 61 engages the headed bolt 70' to move the bolt 47ª downwardly, as shown.

Rigidly connected with the forward end of the cam-shaft 63' is a beveled gear 69, engaged by a beveled gear 70, rigidly connected with an upwardly extending rotatable shaft 71, the upper end of which is rigidly connected with a control lever or crank 72, as shown. This control lever 72 is adapted to be rotated or swung in proximity to a relatively stationary ring or track 73, secured to a stationary portion of the steering mechanism of the automobile, by any suitable means, (not shown). This control lever is provided with a spring pressed latch 74, of any well known or preferred type, adapted to fit within a selected one of the notches 75, designated, "1," "2," "3," "R" and "N," the same being abbreviations for forward first speed, forward second speed, forward third or high speed, reverse and neutral, respectively.

The forward end of the rod 57 is pivotally connected, as shown at 57', with an extension-rod 58', provided with a slotted head 59', receiving a transverse pin 60', carried by a pivoted lever 61', fulcrumed at 62'. This pivoted lever is included in a foot operated pedal 62ª, that is employed to operate the multiple friction-disk or cone clutch mechanism, ordinarily used to connect and disconnect the crank of an engine with and from the driving wheels of the vehicle, in this instance through the medium of the driving shaft 12 and associated elements. The pedal 62ª renders this multiple friction-disk active when swung rearwardly by the spring 60, and inactive when depressed by the foot of the operator, as is customary.

The operation of the apparatus is as follows: When the engine is running, the friction-disk clutch is active for rotating the driving shaft 12, which rotates the pinion or gear 13, pinion or gear 14, shaft 15 and pinions or gears carried thereby. The control lever 72 being at neutral, all of the bolts 47' will be in the inoperative position, within openings 51, the same being held within these openings by the shifting bar or element 54 and cams 62, which now occupies the forward position. As all of the toothed clutch mechanisms are now inactive, the rotation of the driving shaft 12 will not be imparted to the driven shaft 18. The shifting bar 54, being in the forward position, the same will positively prevent the downward movement of the bolts 47', whereby the control lever 72 will be locked against movement. To drive the gearing at forward first or low speed, the pedal lever 61' is depressed by the foot, which simultaneously renders the friction-disk clutch inactive and moves the shifting bar or element 54 to the left, whereby openings or notches 52 are brought into alinement with the bolts 47'. The control lever 72 is now moved to the forward first speed opening or notch 75, whereby shaft 71 is turned, which through the medium of the beveled gears 70 and 69, turns the cam-shaft 63'. The cam-shaft 64' is turned in an opposite direction by the pinions 67 and 68. The cams 61 and 62 in the forward low speed drive, now move or shift the bolt 47' in this drive, downwardly into the opening or notch 52 of the shifting bar or element 54. The other bolts 47' are not moved out of the openings 51. Upon the pedal lever 61' being gradually released and returned by the spring 60 to the elevated position, as is customary in operating the friction-disk clutch, the shifting bar or element 54 travels to the right, moving the shifting fork 42 in the forward low speed drive in the same direction, whereby clutch element 31 is moved into operative engagement with the clutch element 27. The pinion or gear 23 is now locked to the shaft 18, to drive the same. The rotation of the shaft 12 is imparted to the counter shaft 15 by pinions 13 and 14, and the counter shaft will now rotate the driven shaft 18 at forward low speed through the medium of the small pinion 34 operating in engagement with and driving the large pinion 23. The shifting bar or element 54 being now moved to the right, the same locks all of the bolts 47' except the one in the forward low speed drive, within the openings or notches 51, the bolt 47' in the forward low speed drive being retained within the opening 52 by the lock bar or element 53, whereby the control lever 72 is locked against movement, prior to the depression of the pedal lever 61'. When it is desired to use the forward intermediate drive, the pedal lever 61' is again depressed, which renders the friction-disk clutch inactive and shifts bar or element 54 to the left, bringing openings or notches 52 in alinement with openings or notches 51. The control lever 72 is now moved to the second or intermediate opening or notch 75, whereby the cam-shafts 63' and 64' are turned, whereby bolt 47' in the forward low speed drive is returned within the opening or notch 51, the clutch elements 31 and 27 having been previously disengaged. The bolt 47' in the forward intermediate drive will be shifted or moved downwardly, to enter opening or notch 52 and entirely out of opening or notch 51. When the pedal lever 61' is again released, the friction-disk clutch is rendered active, the bar 54 moved to the right, and fork 40 brings clutch element 30 into operative engagement with clutch element 26, to lock pinion 22 to the shaft 18. The shaft 12 will now drive the shaft 18 at forward intermediate speed, the shaft 18 at forward intermediate speed, the pinion 13 rotating pinion 14, which rotates counter-shaft 15, to drive pinions 33, which in turn drives pinion 22, which is now locked to the shaft 18.

The operation of the other drives are so similar to those already stated, it is thought to be unnecessary to set them forth in detail, it being sufficient to state that in operating each of the drives, the pedal lever 61' is first depressed to move the bar 54 to the end of its travel to the left, the control lever 72 then moved to the desired opening or notch 75 corresponding to the selected drive, and the pedal lever 61' gradually released, whereby the corresponding clutch in the selected drive is rendered active. Attention is called to the fact that in the high speed drive, the shaft 18 is not driven through the medium of the counter-shaft 15, such shaft being directly connected with the shaft 12, when clutch element 29 operatively engages clutch element 25.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having described the invention, we claim:—

1. In transmission gearing, a clutch mechanism, an element connected with the clutch mechanism to render the same active and inactive, a movable shifting member provided with means for affording operative connection with a bolt, a bolt connected with the element and movable transversely of the shifting member toward and away from the same to coöperate with the means thereof, and means to shift the bolt laterally with respect to the shifting member.

2. In transmission gearing, a clutch mechanism, a longitudinally movable shifting member provided with holding means, an element associated with the clutch mechanism to render the same active and inactive and movable with relation to the longitudinally movable shifting member to engage and disengage the holding means thereof, means to move the element, and means to move the shifting member.

3. In transmission gearing, driving and driven rotatable members, normally inactive variable speed driving devices to successively operatively connect the driving and driven rotatable members, a movable shifting member normally free from operative connection with the driving devices, a friction clutch operating lever connected with the shifting member to approximately simultaneously render the friction clutch inactive for cutting off the engine from the driving rotatable member and move the shifting member to the starting position, and selective means to operatively connect one of the normally inactive driving devices with the shifting member whereby the same is rendered active upon the return movement of the lever which renders the friction clutch active.

4. In transmission gearing, driving and driven rotatable members, normally inactive variable speed driving devices to successively operatively connect the driving and driven rotatable members, a movable shifting member, means to render the driving devices active including a plurality of connecting members movable into and out of engagement with the shifting member, selective means to move one of the connecting members into engagement with the shifting member while the other connecting members disengage the same, and means to move the shifting member.

5. In transmission gearing, driving and driven rotatable members, normally inactive variable speed driving devices to successively operatively connect the driving and driven rotatable members, clutch elements corresponding in number with the driving devices and adapted when actuated to render the driving devices operative, a movable shifting member, bolts corresponding in number with the clutch elements and connected therewith and adapted to be successively moved into operative engagement with the shifting member, and selective means to move one of the bolts into engagement with the shifting member while the others disengage the same.

6. In transmission gearing, driving and driven rotatable members, normally inactive variable speed driving devices to successively operatively connect the driving and driven members, elements corresponding in number with the driving devices and adapted when actuated to render the same operative, a reciprocatory shifting member provided with bolt receiving means, bolts corresponding in number with the elements and connected therewith and adapted to be successively moved into the bolt receiving means of the shifting member, and selective means to successively move one of the bolts into the bolt receiving means while the other bolts are out of the same.

7. In transmission gearing, driving and driven rotatable members, variable speed driving devices between the driving and driven members, elements corresponding in number with the variable speed driving devices and adapted to control the operation thereof with respect to transmitting rotation from the driving member to the driven member, a movable shifting member provided with bolt receiving means, bolts corresponding in number with the elements and connected therewith for movement into and out of the bolt receiving means, cams to move the bolts in one direction, selective means to move the cams, and means to move the bolts in an opposite direction.

8. In transmission gearing, driving and driven rotatable members, variable speed driving devices between the driving and driven members, elements corresponding in number with the variable speed driving devices and adapted to control the operation thereof with respect to transmitting rotation from the driving member to the driven member, a movable shifting member provided with bolt holding means, bolts corresponding in number with the elements and connected therewith for movement into and out of the bolt holding means, cams engaging corresponding ends of the bolts to move the same in one direction, cams engaging the opposite corresponding ends of the bolts to move the same in an opposite direction, and means to move the cams.

9. In transmission gearing, driving and driven rotatable members, variable speed driving devices between the driving and driven members, elements corresponding in number with the variable speed driving devices and adapted to control the operation thereof with respect to transmitting rotation from the driving member to the driven member, a reciprocatory shifting member provided with bolt receiving notches, a relatively stationary lock member provided with bolt receiving notches in transverse alinement with the first named bolt receiving notches, bolts corresponding in number with the elements and connected therewith and arranged within one set of bolt receiving notches and movable into the other set, cams to move the bolts in one direction, means to turn the cams, means to move the bolts in an opposite direction, and means to reciprocate the shifting member.

10. In transmission gearing, a driven shaft, a plurality of gears normally loosely mounted upon the driven shaft, means to drive the gears at different speeds, devices adapted to lock the gears to the driven shaft to rotate the same, movable bolts corresponding in number with the devices and connected therewith, a shifting member provided with bolt receiving means, means to move the shifting member, and selectively operated means to alternately move the bolts into the bolt receiving means, substantially as described.

11. In transmission gearing, a driven shaft, a plurality of gears normally loosely mounted upon the driven shaft, means to drive certain of the gears at different speeds and one of them in a reverse direction with relation to the others, devices adapted to lock the gears to the driven shaft to rotate the same, movable bolts corresponding in number with the devices and connected therewith, a lock bar extending longitudinally of the driven shaft and provided with notches to receive the movable bolts, a reciprocatory shifting member extending longitudinally of the lock bar and provided with notches to receive the bolts, means to move the reciprocatory shifting member, cams arranged to engage with the bolts to move them in one direction, a cam-shaft carrying the cams, means to turn the cam-shaft, and means to move the bolts in an opposite direction.

12. In transmission gearing, a driven rotatable member, a plurality of gears normally loosely mounted thereon, means to drive the gears at different speeds, clutch mechanisms to lock the gears to the driven member embodying clutch elements splined upon the driven member, shifting forks engaging the clutch elements to move the same, a guide rod receiving the shifting forks thereon, reciprocatory bolts slidably mounted upon the outer ends of the shifting forks, a stationary lock bar having notches to receive the reciprocatory bolts, a reciprocatory shifting bar having notches to receive the reciprocatory bolts, means to move the reciprocatory shifting bar, cams engaging the bolts to move them in one direction, means to turn the cams, and means to move the cams in an opposite direction.

In testimony whereof we affix our signatures in presence of two witnesses.

DONALD S. LEECH.
MERLIN S. EVANS.

Witnesses:
SAMUEL TIEKLE,
DONN CHAMBERLIN.